(12) United States Patent
Scholz et al.

(10) Patent No.: US 11,673,490 B2
(45) Date of Patent: Jun. 13, 2023

(54) ADJUSTMENT FITTING FOR A VEHICLE SEAT AND VEHICLE SEAT

(71) Applicant: Keiper Seating Mechanisms Co., Ltd., Shanghai (CN)

(72) Inventors: Grit Scholz, Remscheid (DE); Rolf Schueler, Heiligenhaus (DE); Kirubaharan Albert Reginold, Burscheid (DE); Dieter Henkel, Remscheid (DE); Balaji Paramasivam, Leverkusen (DE); Arkadius Rock, Solingen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/595,095

(22) PCT Filed: May 8, 2020

(86) PCT No.: PCT/EP2020/062897
§ 371 (c)(1),
(2) Date: Nov. 9, 2021

(87) PCT Pub. No.: WO2020/229353
PCT Pub. Date: Nov. 19, 2020

(65) Prior Publication Data
US 2022/0219578 A1    Jul. 14, 2022

(30) Foreign Application Priority Data
May 10, 2019  (DE) ..................... 10 2019 112 345.3

(51) Int. Cl.
*B60N 2/225* (2006.01)
(52) U.S. Cl.
CPC ......... *B60N 2/2251* (2013.01); *B60N 2/2258* (2013.01)

(58) Field of Classification Search
CPC .. B60N 2/2251; B60N 2/1685; B60N 2/1892; B60N 2/2352; B60N 2/2258; B60N 2/2356; B60N 2/235
(Continued)

(56) References Cited

U.S. PATENT DOCUMENTS 5,588,932 A * 12/1996 Lindblad ............... B60N 2/2251
                                                                 475/341
6,543,850 B1 * 4/2003 Becker .................. B60N 2/2254
                                                                 297/362
(Continued)

FOREIGN PATENT DOCUMENTS

DE         8715063 U1    3/1989
DE         10356614 A1   7/2005
(Continued)

OTHER PUBLICATIONS

European Patent Office, International Search Report and Written Opinion in Application No. PCT/EP2020/062897, dated Aug. 19, 2020, 10 pages, Rijswijk Netherlands.

*Primary Examiner* — Sarah B McPartlin
(74) *Attorney, Agent, or Firm* — Marshall & Melhorn, LLC

(57) ABSTRACT

An adjustment fitting for adjusting an inclination of a backrest of the vehicle seat may have a first fitting part, and a second fitting part which is pivotable about a central axis of rotation relative to the first fitting part and is connectable to the backrest of the vehicle seat. The first fitting part and the second fitting part may be components both of a gear unit, such as a planetary gear, of the adjustment fitting and of a locking device, such as a detent lock, of the adjustment fitting. A vehicle seat having the adjustment fitting is also disclosed.

14 Claims, 10 Drawing Sheets

(58) Field of Classification Search
USPC ....... 297/362, 366, 367, 367 R, 367 P, 367 L
See application file for complete search history.

(56) References Cited

U.S. PATENT DOCUMENTS

| | | | | |
|---|---|---|---|---|
| 8,579,756 | B2 * | 11/2013 | Oki | B60N 2/168 |
| | | | | 475/300 |
| 2002/0033627 | A1 | 3/2002 | Hoshihara et al. | |
| 2004/0251727 | A1 * | 12/2004 | Beneker | B60N 2/2251 |
| | | | | 297/362 |
| 2011/0169313 | A1 * | 7/2011 | Schulz | B60N 2/2251 |
| | | | | 297/362 |

FOREIGN PATENT DOCUMENTS

| | | |
|---|---|---|
| DE | 102006020751 A1 | 11/2007 |
| DE | 102007017672 A1 | 10/2008 |
| DE | 102009038735 A1 | 3/2011 |
| DE | 102011113747 A1 | 3/2013 |
| WO | 2012065721 A1 | 5/2012 |

* cited by examiner

ADJUSTMENT FITTING FOR A VEHICLE SEAT AND VEHICLE SEAT

FIELD

The invention relates to an adjustment fitting for a vehicle seat, in particular for adjusting an inclination of a backrest of the vehicle seat, comprising a first fitting part, in particular connectable to a seat substructure of the vehicle seat, and a second fitting part which is pivotable about a central axis of rotation relative to the first fitting part and is in particular connectable to the backrest of the vehicle seat. The invention further relates to a vehicle seat.

BACKGROUND

DE 103 56 614 A1 discloses a seat having a seat part and having a backrest, wherein the backrest is rotatable relative to the seat part from a first position into a second position and is unlockable relative to the seat part and lockable at least in one of the positions, wherein the seat further comprises a motor and wherein by means of the motor both the unlocking of the backrest relative to the seat part and also the rotation of the backrest from the first position into the second position is provided.

DE 10 2006 020 751 A1 discloses an adjustment fitting for a vehicle seat, wherein the adjustment fitting has a first fitting part and a second fitting part which is provided to be rotatably adjustable relative thereto about an axis of rotation by means of a gear mechanism, wherein the gear mechanism comprises a first toothing on the first fitting part and wherein the gear mechanism comprises a second toothing on the second fitting part eccentrically arranged relative to the first toothing, wherein two wedge segments are provided for securing the eccentric arrangement of the first toothing relative to the second toothing. The wedge segments have an internal radius and an external radius, wherein the adjustment fitting has a brake element and wherein in the radial direction, starting from the axis of rotation, the brake element has an extent approximately corresponding to the external radius of the wedge segments.

A vehicle seat is disclosed in DE 10 2007 017 672 A1 comprising a first seat part, a second seat part which is adjustable relative to the first seat part, an electric motor for the electromotive adjustment of the two seat parts relative to one another and a locking device for locking the seat parts relative to one another. It is provided that by a first partial movement of the electric motor the locking device is unlockable and by a following second partial movement of the electric motor the seat parts are adjustable relative to one another, the electric motor rotates an adjustment means mounted on the first seat part and as a result generates a relative rotation between the adjustment means and the electric motor, in the first partial movement of the electric motor the electric motor is pivoted about the common axis of rotation and as a result unlocks the locking device and in the second partial movement the electric motor is stationary and the adjustment means adjusts the second seat part.

DE 10 2009 038 735 A1 discloses an adjustment device for a vehicle component, in particular for the backrest of a vehicle seat, with a first fitting part and a second fitting part, which are arranged along an axis of rotation, wherein the relative position of the two fitting parts to one another is changeable by means of an eccentric which transmits a torque from a drive onto the first fitting part, so that this fitting part rolls on the second fitting part and the eccentric comprises two eccentric means which is drivable by a driver element which is arranged on the drive and the eccentric comprises a spring means which acts between the two eccentric means. A brake means prevents an automatic adjustment of the adjustment device. The brake means cooperates with a projection on the first fitting part, the central axis thereof extending parallel to the axis of rotation of the device.

WO 2012/065721 A1 discloses an adjustment device for a vehicle component with a first fitting part and a second fitting part which are arranged along an axis of rotation, wherein the relative position of the two fitting parts to one another is changeable by means of an eccentric, which transmits a torque from a drive to a gearwheel so that this gearwheel rolls on the second fitting part, and which preferably comprises two eccentric means, wherein the adjustment device has a brake means which at least substantially prevents the automatic adjustment thereof, wherein the brake means cooperates with a locking contour which is provided on the gearwheel.

A drive for adjusting a member is disclosed in DE 87 15 063 U1, said drive forming part of a closing mechanism of a cover element assigned to an opening in a motor vehicle body, the drive comprising a drive motor which is switchable in the rotational direction and a reduction gear which is arranged downstream of the drive motor and which is operatively connected to the locking element element via an intermediate member. A coupling configured as a clamping coupling is arranged between the gear reduction and the locking element, said coupling having a freewheel position in which the worm gear is coupled out and thus a manual adjustment of the locking element is possible.

Adjustment fittings for vehicle seats, in particular backrest adjusters, are known from the prior art. Backrest adjusters known from the prior art are developed and optimized for adjusting an angle of inclination of a backrest within a relatively small comfort adjustment range about a design position. An electrical drive is increasingly used due to increasingly small installation spaces in newly developed vehicles, in particular between the vehicle seat and a B-pillar and thus the more difficult accessibility of a hand wheel for manual actuation of the backrest adjuster. An electric drive is designed for adjustment by the operator by actuating a corresponding electrical switch. In this case the adjustment speed has to be kept sufficiently low that the seat occupant is able, with the reaction speed available to said occupant, to adjust a desired backrest angle without repeatedly having to adjust the backrest angle back and forth in a corrective manner.

In view of the continually increasing comfort requirements, backrests of rear seat systems are also increasingly electrified such that these backrests may be adjusted completely to the front or rear into a substantially horizontal position for the purpose of providing a greater loading volume in addition to the comfort adjustment range, preferably electrically via remote control or mobile app and at a significantly greater speed than in the case of pure comfort settings.

The parallel development of autonomous vehicles also requires an extended setting range of the vehicle seat used by an occupant controlling the vehicle, in order to be able to increase the comfort for a driver who is no longer continuously steering. This means that in the case of an accident, with occupant safety to be maintained at the same time, a safety belt has to be moved completely with the seat in order to bear closely against the occupant in the case of a vehicle seat or, respectively, a flat adjusted backrest arranged far to the rear. Such belt systems, the shoulder belt thereof no longer being fastened fixedly to the vehicle body on the B-pillar but in the upper region of the backrest, lead to significantly higher loads in the adjustment fitting and as a result with the same basic mechanical principle require more installation space and more weight than in the adjustment fittings known in the prior art.

SUMMARY

The object of the invention is to provide an adjustment fitting, which is optimized for high loads in terms of installation space, and a corresponding vehicle seat.

New technical requirements result from the above-described boundary conditions for an electrical adjustment of an inclination angle of a backrest, compared with adjustment fittings known from the prior art. Firstly, the requirement of a very rapid and at the same time an adjustment function having excellent acoustic behavior leads to the adjustment fittings, which are known from the prior art, in particular wobble gears, and which have system-induced torque fluctuations, no longer meeting requirements. Combined with the simultaneous requirement of a significantly more frequent change of the backrest angle and a requirement for a longer service life associated therewith, toothing geometries and bearing designs which are also known from the prior art encounter limits which are barely able to be physically overcome. Moreover, current wobble gears and the toothings in engagement therewith not only have to be designed for the adjustment process but at the same time also for high load absorption in the event of a crash, which leads to significant compromises in the development of the toothing geometries. Moreover, this also results in the object to provide an adjustment fitting which due to the belt integration may absorb significantly greater loads relative to the prior art.

The object is achieved by an adjustment fitting for a vehicle seat, in particular for adjusting an inclination of a backrest of the vehicle seat, comprising a first fitting part, in particular connectable to a seat substructure of the vehicle seat, and a second fitting part which is pivotable about a central axis of rotation relative to the first fitting part, in particular connectable to the backrest of the vehicle seat, wherein the first fitting part and the second fitting part are components both of a gear unit of the adjustment fitting and of a locking device of a detent lock of the adjustment fitting.

As the first fitting part and the second fitting part are both components of a gear unit of the adjustment fitting and a locking device of the adjustment fitting, the total effort is less than the sum of the individual output for both mechanisms.

The gear unit may have a planetary gear system. The gear unit may be a planetary gear system. The locking device may have a detent lock. The locking device may be a detent lock. A detent lock is to be understood to mean, in particular, a locking device having at least one locking element which is radially movably guided in a fitting part with a toothing and a counter toothing in a further fitting part.

The first fitting part may act as a ring gear of the planetary gear system. The second fitting part may act as a web of the planetary gear system. The planetary gear system may have a sun gear, at least one planet gear, a ring gear and a web. When using the adjustment fitting in a vehicle seat the web of the planetary gear system may be permanently fixed, in particular by the second fitting part being fixedly connected to a seat cushion of the vehicle seat.

The first fitting part may additionally have an inner toothing of the detent lock. The second fitting part may have at least one guide for the locking elements of the detent lock. Alternatively the second fitting part may have an inner toothing of the detent lock and the first fitting part at least one guide for the locking elements of the detent lock.

The first fitting part may have an inner toothing of the gear unit. The first fitting part may have an inner toothing of the locking device. The inner toothing of the gear unit may be arranged axially adjacent to the inner toothing of the locking device. Alternatively the inner toothing of the gear unit may be identical to the inner toothing of the locking device.

The second fitting part may have at least one guide for at least one locking element of the detent lock. The at least one locking element may be movable by rotating an eccentric subassembly from a central position of the eccentric subassembly into a position unlocking the adjustment fitting and may be movable into a position locking the adjustment fitting by means of an opposing rotation back into the central position of the eccentric subassembly.

The adjustment fitting preferably has an interface for connecting the adjustment fitting to a drive. The interface may be a drive socket. The drive may be a drive shaft or have a drive shaft. The drive shaft may be drivable by electric motor. The drive shaft may be mechanically drivable. The drive shaft may be drivable by means of a hand wheel. The drive shaft may be drivable by means of an indexing gear.

A rotation of a drive socket from a central position of this drive socket by means of a clamping coupling may effect a rotation of the eccentric subassembly. The clamping coupling may be designed such that after rotation of the drive socket beyond a defined angle, the clamping coupling opens such that the drive socket may rotate further beyond the defined angle without rotating the eccentric subassembly at the same time.

A sun gear of the gear stage may be coupled with an empty angle to the drive socket, such that with a rotation of the drive socket from the central position thereof to a defined rotational angle of the drive socket the sun gear remains immobile, and with a rotation of the drive socket beyond the defined angle the sun gear rotates therewith.

A gear stage may be arranged between the drive socket and the sun gear. The gear stage may be a wobble gear. The gear stage may have a wobble gear.

The object is additionally achieved by a vehicle seat with an adjustment fitting according to the invention. Such a vehicle seat may deflect high loads from a backrest via the adjustment fitting into a seat substructure and yet compared with vehicle seats known from the prior art may be more lightweight and cost-effective. The vehicle seat may have an integrated belt system. A fitting according to the invention is preferably arranged on the seat side on which a belt of a belt strap of the belt system also emerges from the backrest. A rotary bearing known from the prior art, a fitting known from the prior art or a further adjustment fitting according to the invention may be arranged on the other side of the vehicle seat.

In summary and in other words, the invention in particular achieves the object of providing an adjustment fitting which provides both an excellent adjustment function and a greater load absorption. To this end, two different operating principles are used in one adjustment fitting, said operating principles acting in parallel within the adjustment fitting and in each case optimally fulfilling one of the requirements. For the function of a "frequent, acoustically optimized adjustment", conventional substantially symmetrically constructed gear units, in particular planetary gear systems, have also proved advantageous in many adjustment systems within vehicle seats. Such planetary gear systems are used, in particular, for adjustment functions with rather moderate crash load requirements, such as seat cushion inclination adjusters and the like.

For the function of a "high crash load absorption with a small installation space", however, locking devices known from the prior art, in particular detent fittings provided with detent locks, have proved superior, said detent fittings with their toothed rings, locking elements and locking element guides which are optimized for load absorption, with an acceptable number of steps in a relatively small installation space and with a low weight, representing a good choice for load absorption in seats having an integrated belt.

The invention combines these two known operating principles into the smallest installation space and permits the one and/or the other mechanism to operate optimally during use for the function which is respectively present, wherein by clever design and construction different individual parts are used in both mechanisms at the same time and thus the overall effort is lower than the sum of the individual outlay for the two mechanisms.

DESCRIPTION OF THE FIGURES

The invention is described in more detail hereinafter with reference to advantageous exemplary embodiments shown in the figures. The invention, however, is not limited to these exemplary embodiments. In the figures.

DETAILED DESCRIPTION

Figure 1:
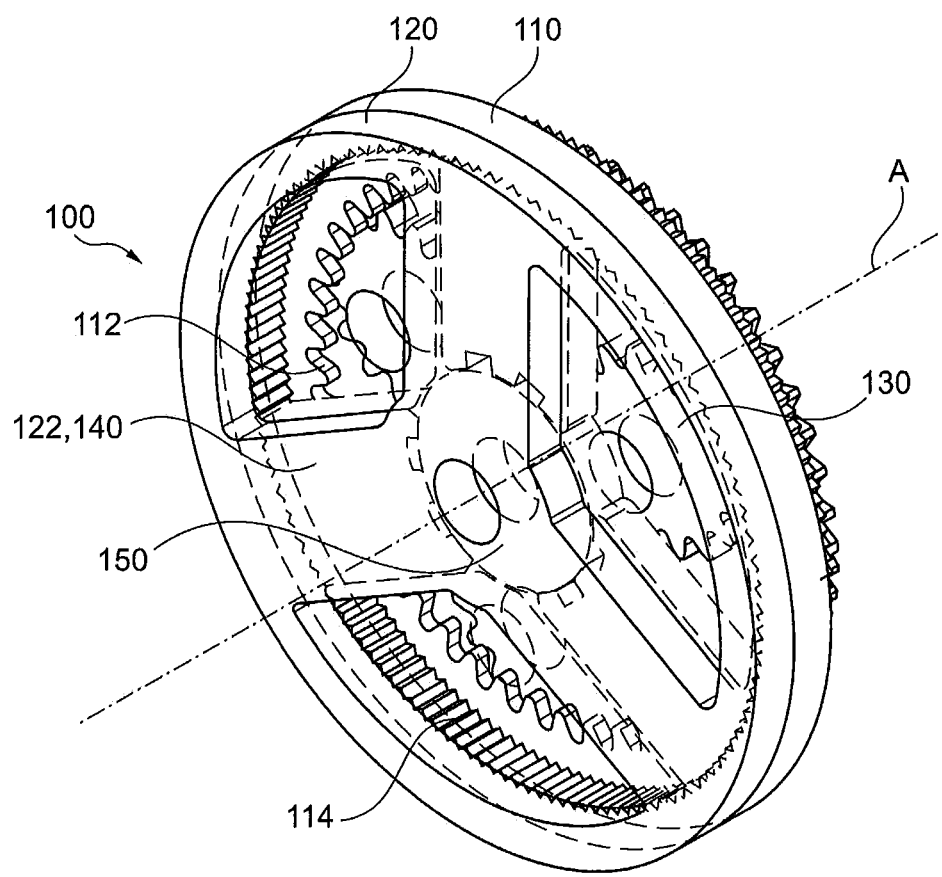
FIG. 1: shows a perspective transparent view of an adjustment fitting according to the invention according to a first exemplary embodiment.
Figure 2:
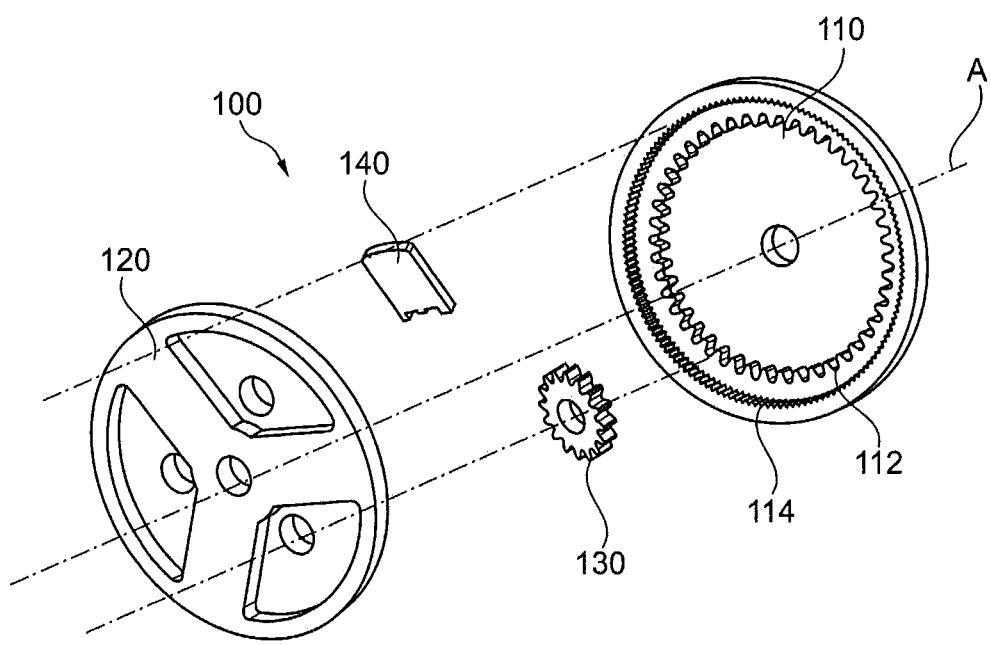
FIG. 2: shows an exploded view of parts of the adjustment fitting of FIG. 1, wherein only one gearwheel and one locking element are shown.

FIGS. 1 and 2 show an adjustment fitting 100 according to a first exemplary embodiment. The adjustment fitting 100 combines a gear fitting configured as a planetary gear system and a detent lock.

The adjustment fitting 100 has a first fitting part 110, a second fitting part 120, three gearwheels 130 and three locking elements 140. The first fitting part 110 and the second fitting part 120 are substantially disk-shaped, wherein the first fitting part 110 is configured to be slightly pot-shaped. The first fitting part 110 and the second fitting part 120 are rotatably mounted radially outwardly about a central axis of rotation A relative to one another by means of a clamping ring, not shown in the figures. Such a clamping ring is disclosed, for example, in DE 10 2009 041 492 A1. The gearwheels 130 and the locking elements 140 are arranged in a receiving space formed by the fitting parts 110, 120.

The first fitting part 110 is, for example, fixedly connectable to a seat substructure 3 of a vehicle seat 1 and the second fitting part 120 is fixedly connectable to a backrest 5 of the vehicle seat 1. The first fitting part 110 is alternatively connectable to a backrest of a vehicle seat and the second fitting part 120 to the seat substructure of the vehicle seat.

Unless described otherwise, the terms radial, axial and in the peripheral direction refer to the central axis of rotation A of the adjustment fitting 100. "Radial" means perpendicular to the central axis of rotation A. "Axial" means in the direction of or parallel to the central axis of rotation A.

The first fitting part 110 has a first inner toothing 112 and a second inner toothing 114. The first inner toothing 112 is arranged axially offset to the second inner toothing 114. The second inner toothing 114 is preferably designed to be finer in comparison with the first inner toothing 112. The first inner toothing 112 forms a ring gear of the planetary gear system of the gear fitting. The second inner toothing 114 is a component of the detent lock.

The second fitting part 120 acts both as a web of the planetary gear system and as a guide component of the detent lock. The three gearwheels 130 act as planet gears of the planetary gear system and in each case are rotatably mounted on one of a total of three bearing pins of the second fitting part 120 acting as a web and are in toothed engagement with the first inner toothing 112. Thus the three bearing pins form three axes of rotation for in each case one gearwheel 130, wherein these axes of rotation are arranged so as to be uniformly distributed about the central axis of rotation A and run parallel thereto.

The bearing pins of the web in the present case are arranged distributed by 120 degrees relative to one another about the central axis of rotation A. A sun gear mounted rotatably relative to the fitting parts 110, 120 about the central axis of rotation A is not shown in FIGS. 1 and 2. The sun gear is preferably a pinion connected directly or by additional components to an output shaft of an electric motor, also not shown in FIGS. 1 and 2, in particular a geared motor. The first fitting part 110 configured as a ring gear, the second fitting part 120 configured as a web, the gear wheels 130 acting as planet gears and the sun gear form the planetary gear system.

The second fitting part 120 is additionally configured as a guide component of the detent lock. To this end, the second fitting part 120 has three guide channels 122 for in each case one of the three locking elements 140. The locking elements 140 are movably guided in each case relative to the central axis of rotation A, in the radial direction in an assigned guide 122. The locking elements 140 bear radially outwardly in each case a toothing 142 which is able to be brought into toothed engagement with the second inner toothing 114 of the first fitting part 112. To this end, the locking elements 140 in a manner known per se may be controlled into the second inner toothing 114 and controlled out of the second inner toothing 114 by means of an eccentric 150 which is pivotable about the central axis A. The eccentric 150 may be a component of an eccentric subassembly which has a control disk for targeted movement of the locking elements 140 radially inwardly.

If the locking elements 140 guided in the second fitting part 120 are in toothed engagement with the second inner toothing 114 of the first fitting part 110, the first fitting part 110 and the second fitting part 120 are locked together such that a relative rotation about the central axis of rotation A may not take place.

A torque introduced into the sun gear is forwarded via the gearwheels 130 to the second fitting part 120 (web). The planetary gear system of the adjustment fitting 100 serves for the adjustment of the backrest. The number of teeth of the toothings of this planetary gear system may be designed, constructed and optimized for an adjustment function at high speed.

Idle and control paths, not shown in FIGS. 1 and 2, which in each case act between an output shaft of the geared motor, the eccentric 150 of the detent lock and the sun gear, are designed such that when actuating the geared motor with the movement of the output shaft, in particular after slight rotational play, initially the eccentric 150 is rotated, whereby the locking elements 140 are pulled radially inwardly out of the toothed engagement with the second inner toothing 114 so that the first fitting part 110 and the second fitting part 120 are no longer locked together. With a further rotation of the output shaft, a part of the output shaft comes into contact with a driver geometry on the sun gear and drives the sun gear.

Due to a required drive movement on both sides of the adjustment fitting 100 and the requirement when switching off the geared motor, to achieve automatically a braced overall position of the adjustment fitting 100 without play, it is advantageous that when using a self-locking geared motor after finishing the rotational movement the geared motor again moves into a "zero position" or, respectively, "central position" in order to be able to perform the next adjustment process in any direction again as described above. A corresponding activation may take place by means of an electrical controller. In principle, however, the described functional sequence (driving to the central position) on a purely mechanical path, may also take place by using coupling units, springs, idle paths and disconnections between the relevant components and by using a non-self-locking geared motor.

Figure 3:
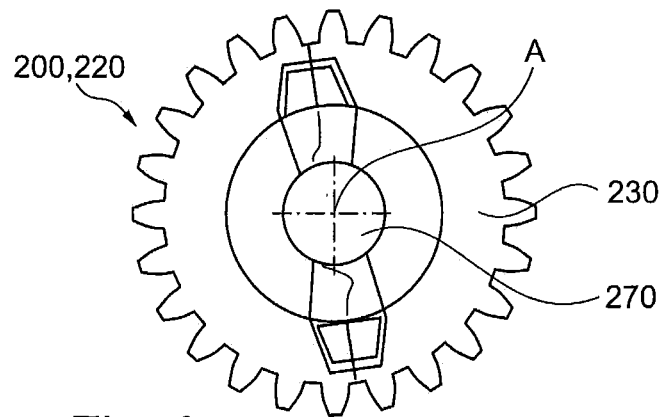
FIG. 3: shows a basic sketch of a gear fitting of an adjustment fitting according to the invention according to a second exemplary embodiment.
Figure 4:
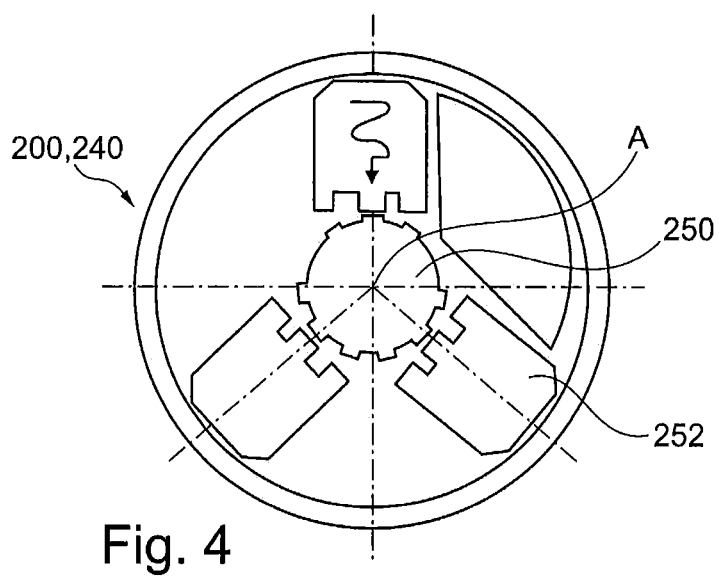
FIG. 4: shows a basic sketch of a detent lock of the adjustment fitting according to the second exemplary embodiment.
Figure 5:
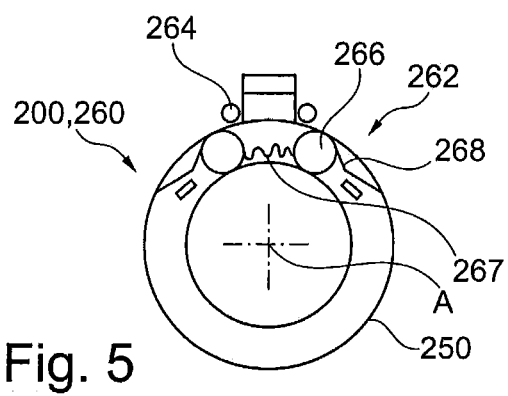
FIG. 5: shows a mechanical logic element of the adjustment fitting according to the second exemplary embodiment.
Figure 6:
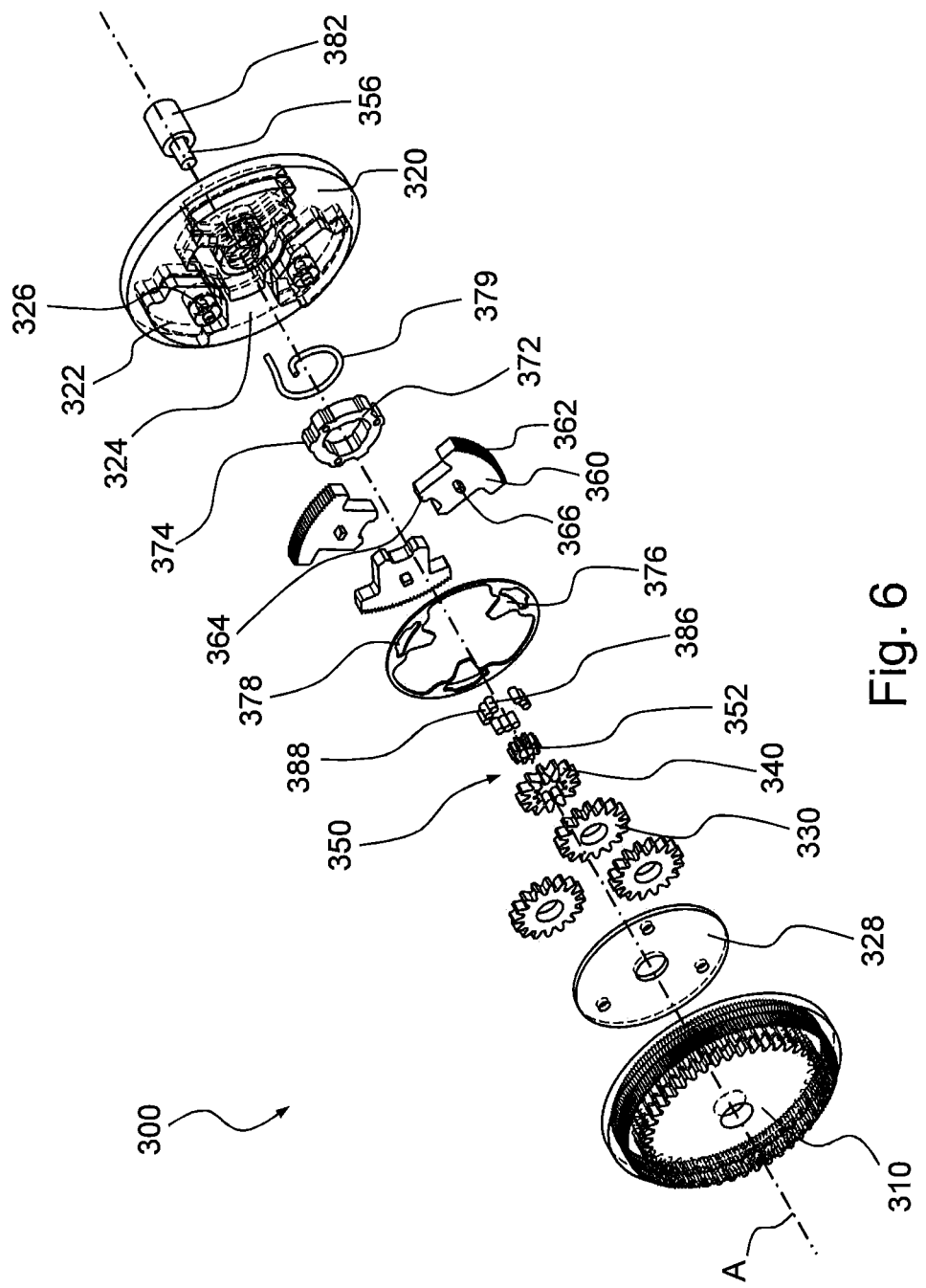
FIG. 6: shows an exploded view of essential components of an adjustment fitting according to the invention according to a third exemplary embodiment.
Figure 7:
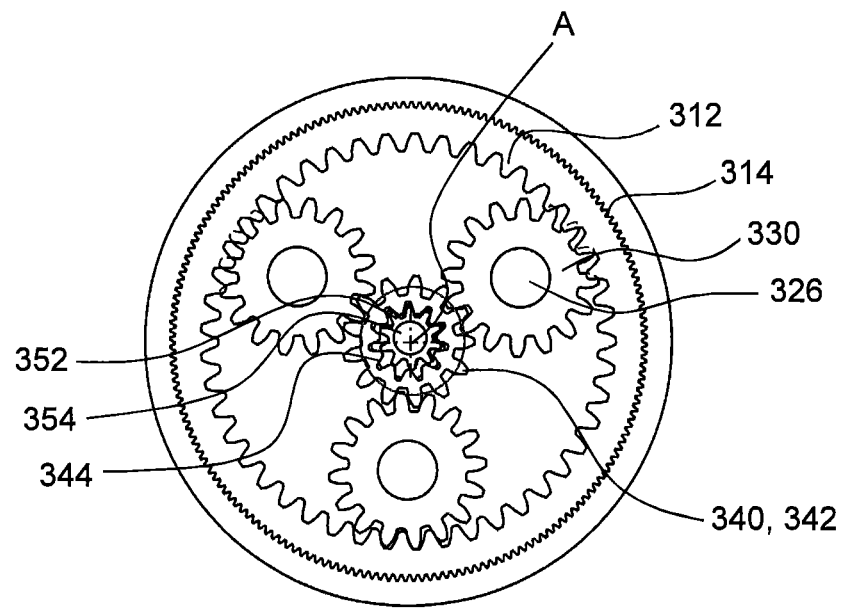
FIG. 7: shows a view of components of a gear fitting of the adjustment fitting of FIG. 6, FIG. 8: shows a view of components of a detent lock of the adjustment fitting of FIG. 6.
Figure 8:
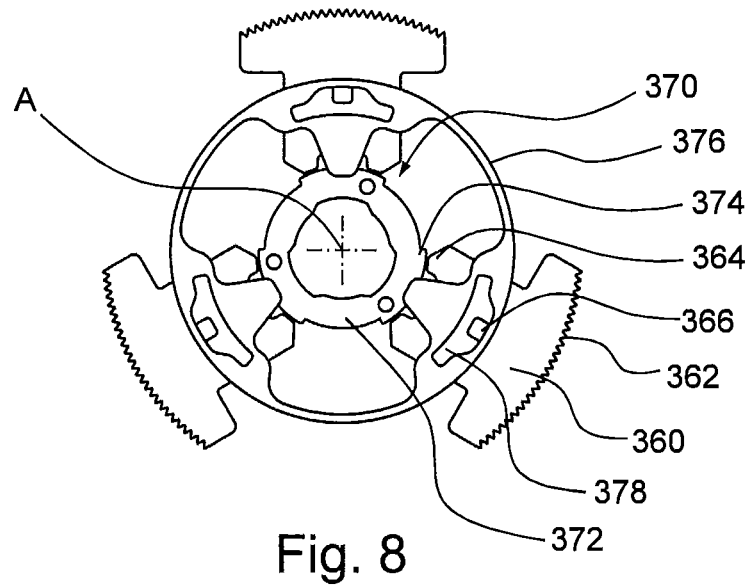
Figure 9:
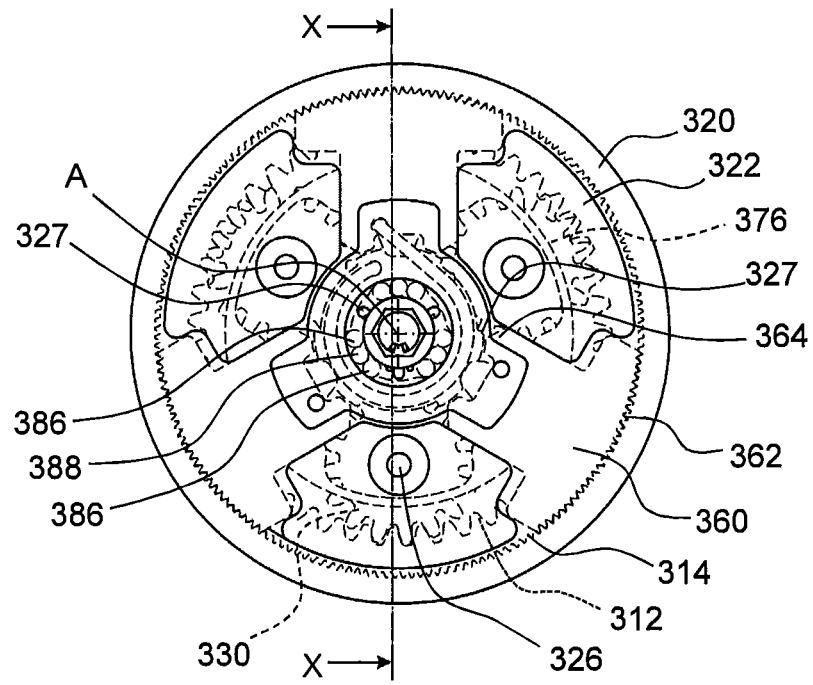
FIG. 9: shows a view of components of the gear fitting, the detent lock and a clamping coupling of the adjustment fitting of FIG. 6, FIG. 10: shows a section along the line X-X in FIG. 9, FIG. 11: shows a detailed view of FIG. 9 of the region of the clamping coupling.
Figure 10:
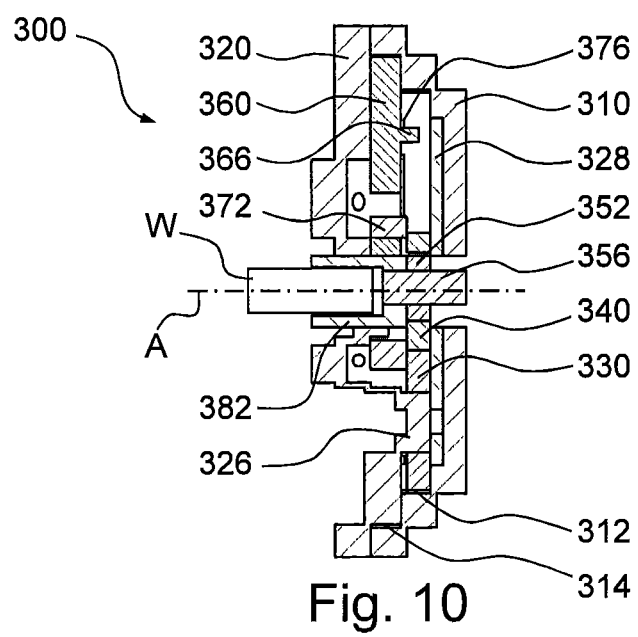
Figure 11:
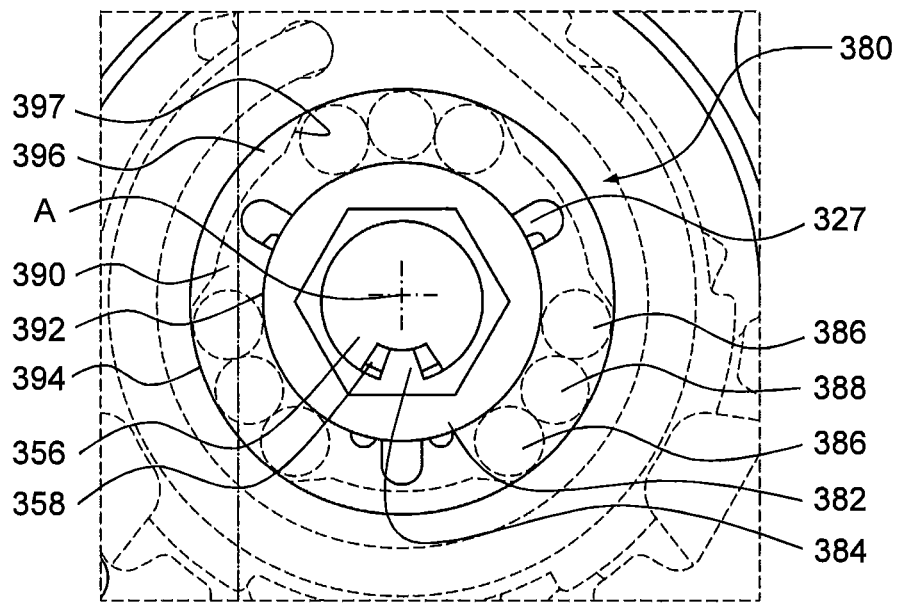
Figure 12:
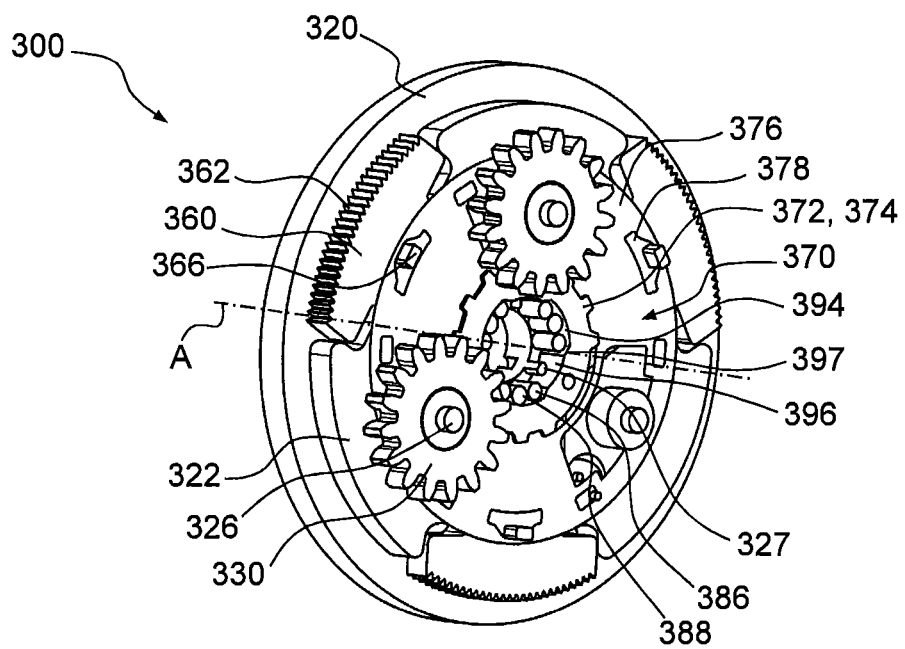
FIG. 12: shows a perspective view of components of the gear fitting, the detent lock and the clamping coupling of the adjustment fitting of FIG. 6, FIG. 13: shows an exploded view of essential components of an adjustment fitting according to the invention according to a fourth exemplary embodiment.
Figure 13:
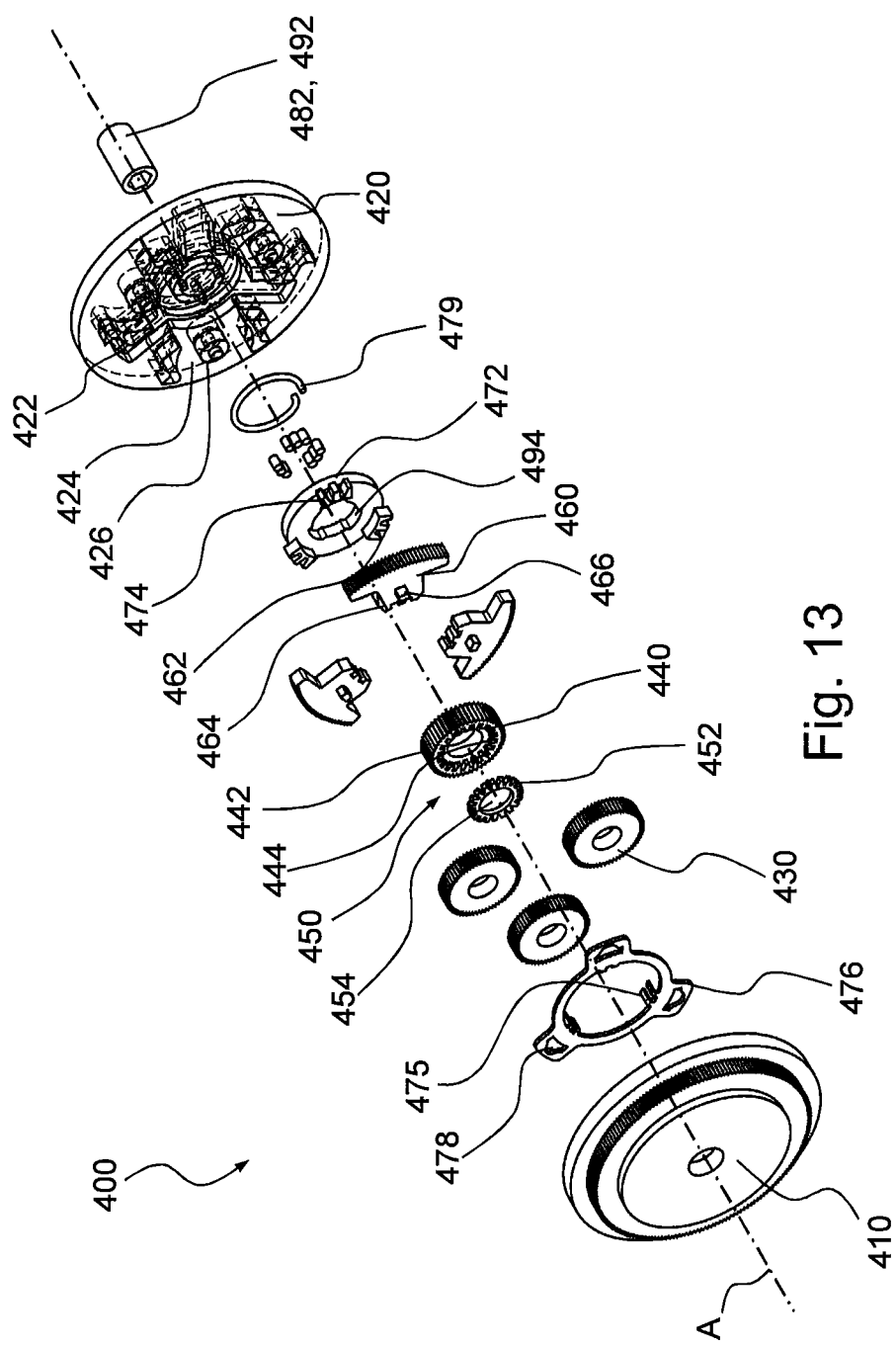
Figure 14:
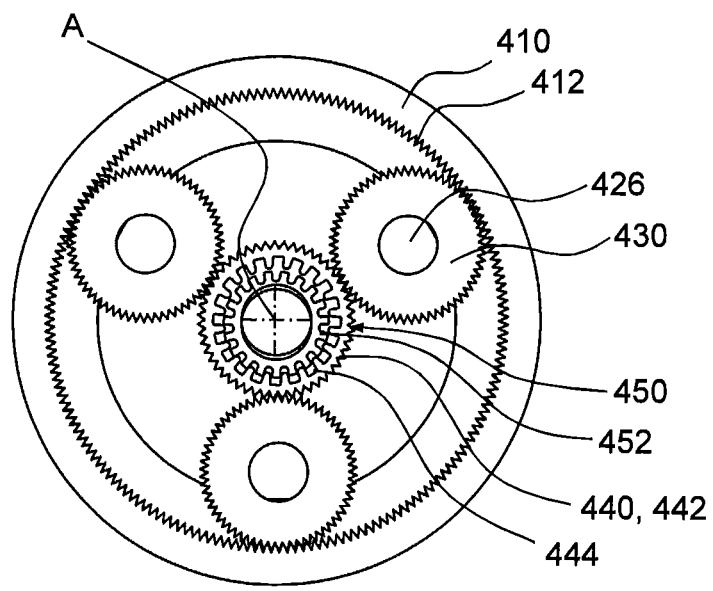
FIG. 14: shows a view of components of a gear fitting of the adjustment fitting of FIG. 13, FIG. 15: shows a view of components of a detent lock of the adjustment fitting of FIG. 14, FIG. 16: shows a view of components of the gear fitting, the detent lock and a clamping coupling of the adjustment fitting of FIG. 14, FIG. 17: shows a section along the line XVII-XVII in FIG. 16, and FIG. 18: shows schematically a vehicle seat according to the invention.
Figure 15:
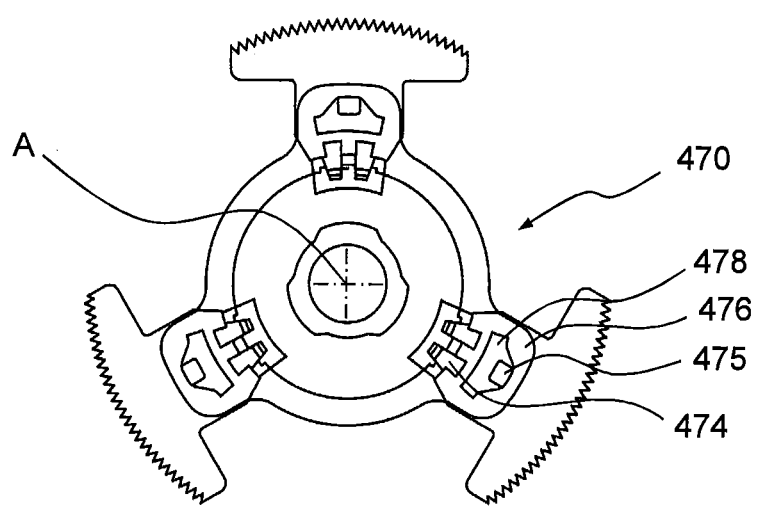
Figure 16:
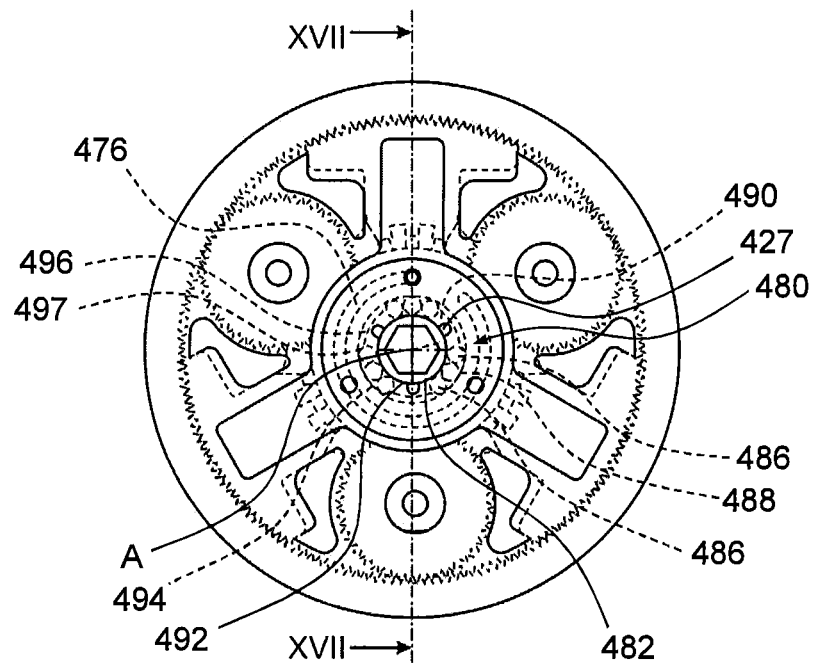

FIGS. 3, 4 and 5 show in a highly simplified and symbolic manner essential components of an adjustment fitting 200 according to a second exemplary embodiment, namely exclusively components of a gear fitting 220 (FIG. 3), components of a detent lock 240 (FIG. 4) and components of a mechanical logic element 260 (FIG. 5). The adjustment fitting 200 corresponds regarding its construction and its function to the adjustment fitting 100 of the first embodiment, unless described otherwise hereinafter.

The mechanical logic element 260 in the present case is designed as a bi-directional switchable clamping roller freewheel 262. The mechanical logic element 260 firstly permits a directionally-dependent driving, in particular taking place after passing through an idle path, of an eccentric 250 for the radial movement of locking elements 252 of the detent lock 240 by an output shaft 270 of a geared motor cooperating with a sun gear 230, in particular after passing through an idle path, secondly also a free reverse movement of the eccentric 250 by a (zero position) spring 264, after the clamping roller freewheel (inner surface of the eccentric 250, cylinder rollers 266, compression spring 267, control webs 268) has released the force-fit connection. The eccentric 250 may be a component of an eccentric subassembly which has a control disk for targeted movement of the locking elements 252 radially inwardly.

In modifications of the second exemplary embodiment further mechanical operating principles are used such as coil spring couplings, axially acting, geometric or force controlled toothed couplings, etc. Overall a plurality of possible variants are produced for the main functional elements of the gear, detent and control logic.

FIGS. 6 to 12 show an adjustment fitting 300 according to a third exemplary embodiment of the invention. The adjustment fitting 300 corresponds relative to its construction and its function to the adjustment fitting 200 of the second exemplary embodiment, unless described differently hereinafter.

The adjustment fitting 300 combines a gear fitting configured as a planetary gear system and a detent lock.

The adjustment fitting 300 has a first fitting part 310, a second fitting part 320, three gearwheels 330, a sun gear 340, a gear stage 350 for driving the sun gear 340, three locking elements 360, an eccentric subassembly 370 and a clamping coupling 380.

The first fitting part 310 and the second fitting part 320 are substantially disk-shaped, wherein the first fitting part 310 is configured to be slightly pot-shaped.

The first fitting part 310 and the second fitting part 320 are rotatable relative to one another about a central axis of rotation A. The first fitting part 310 and the second fitting part 320 are rotatably mounted radially relative to one another by means of a clamping ring, not shown in the figures. Such a clamping ring is disclosed, for example, in DE 10 2009 041 492 A1. The remaining components of the adjustment fitting 300, in particular the gearwheels 330, the sun gear 340, the gear stage 350, the locking elements 360, the eccentric subassembly 370 and the clamping coupling 380 are substantially arranged in a receiving space formed by the adjustment fitting parts 310, 320.

Unless described otherwise, the terms radial, axial and in the peripheral direction refer to the central axis of rotation A of the adjustment fitting 300. "Radial" means perpendicular to the central axis of rotation A. "Axial" means in the direction of or parallel to the central axis of rotation A.

The first fitting part 310 has a first inner toothing 312 and a second inner toothing 314. The first inner toothing 312 is arranged axially offset to the second inner toothing 314. The second inner toothing 314 is arranged axially closer to the second fitting 320 than the first inner toothing. The second inner toothing 314 is preferably designed to be finer in comparison with the first inner toothing 312. The first inner toothing 312 forms a ring gear of the planetary gear system of the adjustment fitting 300. The second inner toothing 314 is a component of the detent lock of the adjustment fitting 300.

The second fitting part 320 thus acts both as a web of the planetary gear system and as a guide component of the detent lock. For guiding the locking elements 360 in the radial direction the second fitting part 320 has three guide segments 322 arranged evenly distributed over the periphery. In each case a locking element 360 is guided in one respective guide 324 and formed by two respective guide segments 322.

The three gearwheels 330 act as planet gears of the planetary gear system and in each case are rotatably mounted on one of a total of three bearing pins 326 of the second fitting part 320 acting as a web and are permanently in toothed engagement with the first inner toothing 312. The three bearing pins 326 form three further axes of rotation oriented parallel to the central axis of rotation A for one respective gearwheel 330. The bearing pins 326 of the web are in the present case arranged distributed by 120 degrees to one another about the central axis of rotation A.

A locking plate 328 having three holes is pushed onto the end regions of the three bearing pins 326. The end regions of the three bearing pins 326 are arranged in the three holes. The locking plate 328 secures the gearwheels 330 in the axial direction and is rotatably mounted radially in the adjustment fitting part 310. Preferably the end regions of the bearing pins 326 are compressed such that the locking plate 328 is held by a frictional connection on the bearing pins 326.

The sun gear 340 which is rotatably mounted about the central axis of rotation A relative to the two fitting parts 310, 320 has an outer toothing 342 and an inner toothing 344. The outer toothing 342 of the sun gear 340 is in toothed engagement with the gearwheels 330. The rotating sun gear 340 thus drives the second fitting part 320 via the gearwheels 330. The first fitting part 310 configured as a ring gear and the second fitting part 320 configured as a web, the gearwheels 330 acting as planet gears and the sun gear 340 form the planetary gear system.

The sun gear 340 is drivable via the gear stage 350, wherein the sun gear 340 itself is a component of the gear stage 350. The gear stage 350 is drivable by means of a drive shaft W shown exclusively in FIG. 10, which is drivable rotatably about the central axis of rotation A, but does not have to belong to the eccentric subassembly of the adjustment fitting 300. Preferably the drive shaft W is drivable by means of an electric motor, not shown in the figures, in particular a geared motor.

The gear stage 350 has a spur gear 352 mounted eccentrically to the central axis of rotation A, with a central circular opening 254. A number of teeth of the spur gear 352 is at least one tooth smaller than a number of teeth of the inner toothing 344 of the sun gear 340. The spur gear 352 is in toothed engagement with the inner toothing 344 of the sun gear 340. An eccentric shaft 356 is arranged in the opening 354 of the spur gear 352, said eccentric shaft being drivable by the drive shaft W with an eccentricity about the central axis of rotation A in a wobbling manner. To this end the eccentric shaft 356 is mounted eccentrically relative to the central axis of rotation A. The eccentric shaft 356 is mounted in a drive socket 382 which is mounted so as to be aligned with the central axis of rotation A in the second fitting part 310.

In a central position of the drive socket 382 in which the detent lock is locked, the drive socket 382 is initially rotatable in a defined manner in both rotational directions in the region of one respective empty angle before the drive socket 382 rotates the eccentric shaft 356. In both rotational directions the eccentric shaft 356, after passing through the respective empty angle out of the central position, is coupled to the drive socket 382 for entrainment. For generating the empty angle, a driver pin 384 of the drive socket 382 engages in a groove 358 of the eccentric shaft 356, with a play corresponding to the empty angles.

The drive socket 382 in the present case is connectable in a rotationally fixed manner to the drive shaft W, in particular by a spline. The drive socket 382 rotating about the central axis of rotation A after passing through the empty angle effects, via the eccentric shaft 356 wobbling about the central axis of rotation A, a drive of the sun gear 340 with a gear reduction corresponding to the tooth ratio of the wobble gear.

The locking elements 360 in each case relative to the central axis of rotation A are movably guided in the radial direction in the respectively assigned guide 324. The locking elements 360 bear radially outwardly in each case a toothing 362 which is able to be brought into toothed engagement with the second inner toothing 314 of the first fitting part 310. To this end the locking elements 360 may be controlled into the second inner toothing 314 and controlled out of the second inner toothing 314 by means of the eccentric subassembly 370. If the locking elements 360 guided in the second fitting part 320 are in toothed engagement with the second inner toothing 314 of the first fitting part 310, the first fitting part 310 and the second fitting part 320 are locked together such that no relative rotation about the central axis of rotation A may take place.

The eccentric subassembly 370 comprises an eccentric 372 with radially protruding eccentric cams 374 and a control disk 376 which is connected fixedly in terms of rotation, in the present case via lugs, to the eccentric 372. The control disk has three control slides 378 for the targeted movement of the locking elements 360. The locking elements 360 have in each case a control lug 366 which engages in one respective control slide 378 of the control disk 376.

The locking elements 360 have cams 364 which are configured radially inwardly in a complementary manner to the eccentric cams 374 and which may be supported by the eccentric cams 374. In a central position of the eccentric 372 the eccentric cams 374 of the eccentric 372 support the locking elements 360 radially such that the toothing 362 of the locking elements 360 is held in engagement with the second inner toothing 314. If the eccentric 372 is outside its central position the cams 364 are not supported by the eccentric cams 374.

By rotating the eccentric subassembly 370 about the central axis of rotation A, the eccentric 372 rotates out of its central position, whereby the eccentric cams 374 rotate away below the cams 364 of the locking elements 360 so that the locking elements 360 are movable radially inwardly and thus out of the second inner toothing 314 of the first fitting part 310. To this end, the control slide 378 is formed such that the control lugs 366 of the locking elements 360 are pulled correspondingly radially inwardly by means of the control slides 378. The eccentric subassembly 370 is pretensioned by means of a spring 379 from both rotational directions into the one central position of the eccentric subassembly 370. When rotating the eccentric 372 back into the central position of the eccentric subassembly 370, the control slides 378 release a movement of the control lugs 366 of the locking elements 360 radially outwardly. Additionally the eccentric cams 374 move the locking elements 360 radially outwardly into toothed engagement with the second inner toothing 314 of the first fitting part 310. The present rotational angular position of the drive socket 382 is now the new central position thereof for the next adjustment process of the adjustment fitting 300. In a modification of the exemplary embodiment, alternatively the locking elements 360 may also be moved outwardly by individual spring elements.

The clamping coupling 380 has the effect that with a rotation of the drive socket 382 the eccentric subassembly 370 is initially rotated, whereby the locking elements 360 are pulled radially inwardly out of the toothed engagement with the second inner toothing 314, so that the first fitting part 310 and the second fitting part 320 are no longer locked together. With a further rotation of the drive socket 382, after passing through the empty angle between the drive socket 382 and the eccentric shaft 356, the driver pin 384 rotates the eccentric shaft 356 and drives, as described above, the gear stage 350 and thus the sun gear 340.

The clamping coupling 380 has six clamping bodies designed as clamping rollers 386 and three energy storage elements designed as rubber springs 388 which are arranged in an annular channel 390. A radial inner annular channel wall 392 is defined by an outer peripheral surface of the drive socket 382. The radial inner annular channel wall 392 is circular cylindrical. A radial outer annular channel wall 394 is formed by an opening in the eccentric 372. The radial outer annular channel wall 394 has three circular cylindrical portions, in the peripheral direction in each case one of a total of three clamping beads 396 being arranged therebetween. The clamping beads 396 face in the direction of the radial inner annular channel wall 392 and, viewed in the peripheral direction, in each case have an oblique lead-in surface 397 on both sides respectively for one of the clamping rollers 386.

The annular channel 390 has in the region of the circular cylindrical portions of the radial outer annular channel wall 390 in the radial direction a width which is slightly greater than a diameter of the clamping rollers 386. In the region of the lead-in surfaces 397 the annular channel 390 in the radial direction has a width which is smaller than a diameter of the clamping rollers 386.

In each case two clamping rollers 386 form a clamping roller pair and are arranged between two lead-in chamfers 397 of adjacent clamping beads 396. The clamping coupling 380 has three equally acting clamping roller pairs, of which only one clamping roller pair is described hereinafter.

In each case one of the rubber springs 388 is arranged between the two clamping rollers 386 of the clamping roller pair. The rubber springs 388 in an unactuated state of the adjustment fitting 300 brace the two clamping rollers 386 away from one another against an assigned lead-in chamfer 397. Depending on the rotational direction of the drive socket 382 (the radial inner annular channel wall 392) one of the two clamping rollers 386 is clamped between a lead-in chamfer 397 and the radial inner annular channel wall 392 so that the radial inner annular channel wall 392 is connected by a frictional connection to the radial outer annular channel wall 394. As a result, a rotational movement of the drive socket 382 initially causes a rotation of the eccentric subassembly 372 so that the locking elements 360 are pulled radially inwardly into an unlocked position. The clamping rollers 386 and the annular channel walls 394 at the same time rotate relative to the fitting parts 310, 320.

The second fitting part 320 has three unlocking cams 327, in each case one unlocking cam 327 thereof engaging between two clamping rollers 386 of adjacent clamping rollers. In an unactuated state of the adjustment fitting 300 in each case an unlocking cam 327 is arranged centrally between the two clamping rollers 386. The unlocking cams 327 have in each case a spacing from the clamping rollers 386.

With a rotational movement of the drive socket 382 the eccentric subassembly 372 rotates therewith until the clamping rollers 386 run against the unlocking cams 327 of the second fitting part 320. By the clamping rollers 386 running against the unlocking cams 327 the clamping rollers 386 are pushed by further pretensioning of the rubber springs 388 from the assigned lead-in chamfers 397, whereby the entrainment of the eccentric subassembly 372 is interrupted.

During the course of the further rotational movement of the drive socket 382, the driver pin 384 of the rotating drive socket 382 now comes into abutment with a wall defining the groove 358 of the eccentric shaft 356, whereby the eccentric shaft 356 is rotated therewith and drives the planetary gear system. As soon as the drive of the drive socket 382 is terminated, the spring 379 rotates the eccentric subassembly 370 again in the central position thereof so that the adjustment fitting 300 is locked again.

FIGS. 13 to 17 show an adjustment fitting 400 according to a third exemplary embodiment of the invention. The adjustment fitting 400 corresponds to the adjustment fitting 300 of the third exemplary embodiment regarding its construction and its function, unless described differently hereinafter.

The adjustment fitting 400 combines a gear fitting configured as a planetary gear system and a detent lock.

The adjustment fitting 400 has a first fitting part 410, a second fitting part 420, three gearwheels 430, a sun gear 440, a gear stage 450 for driving the sun gear 440, three locking elements 460, an eccentric subassembly 470 and a clamping coupling 480.

The first fitting part 410 and the second fitting part 420 are rotatable relative to one another about a central axis of rotation A. The first fitting part 410 and the second fitting part 420 are rotatable radially relative to one another by means of a clamping ring, not shown in the figures.

Unless described differently, the terms radial, axial and in the peripheral direction refer to the central axis of rotation A of the adjustment fitting 400. "Radial" means perpendicular to the central axis of rotation A. "Axial" means in the direction of or parallel to the central axis of rotation A.

The first fitting part 410 has exactly one inner toothing 412. The inner toothing 412 forms a ring gear of the planetary gear system and is additionally a component of the detent lock.

The second fitting part 420 thus acts both as a web of the planetary gear system and as a guide component of the detent lock. For guiding the locking elements 460 in the radial direction the second fitting part 420 has three guide segments 422 arranged equally distributed over the periphery. In each case one locking element 360 is guided in one respective guide 424.

The three gearwheels 430 act as planet gears of the planetary gear system and in each case are rotatably mounted on one of a total of three bearing pins 426 of the second fitting part 420 acting as a web and are permanently in toothed engagement with the inner toothing 412. The bearing pins 426 of the second fitting part 420 in the present case are arranged so as to be distributed by 120 degrees relative to one another about the central axis of rotation A.

The sun gear 440 which is rotatably mounted relative to the two fitting parts 410, 420 about the central axis of rotation A has an outer toothing 442 and an inner toothing 444. The outer toothing 442 of the sun gear 340 is in toothed engagement with the gear wheels 430. The rotating sun gear 440 thus drives the second fitting part 420 via the gearwheels 430. The first fitting part 410 configured as a ring gear, the second fitting part 420 configured as a web, the gearwheels 430 acting as planet gears and the sun gear 440 form the planetary gear system.

The sun gear 440 is drivable via the gear stage 450, wherein the sun gear 440 itself is a component of the gear stage 350. The gear stage 350 is drivable by means of a drive shaft, not shown in FIGS. 13 to 17, which is rotatably drivable about the central axis of rotation A but does not have to belong to the subassembly of the adjustment fitting 400.

Figures 17, 18:
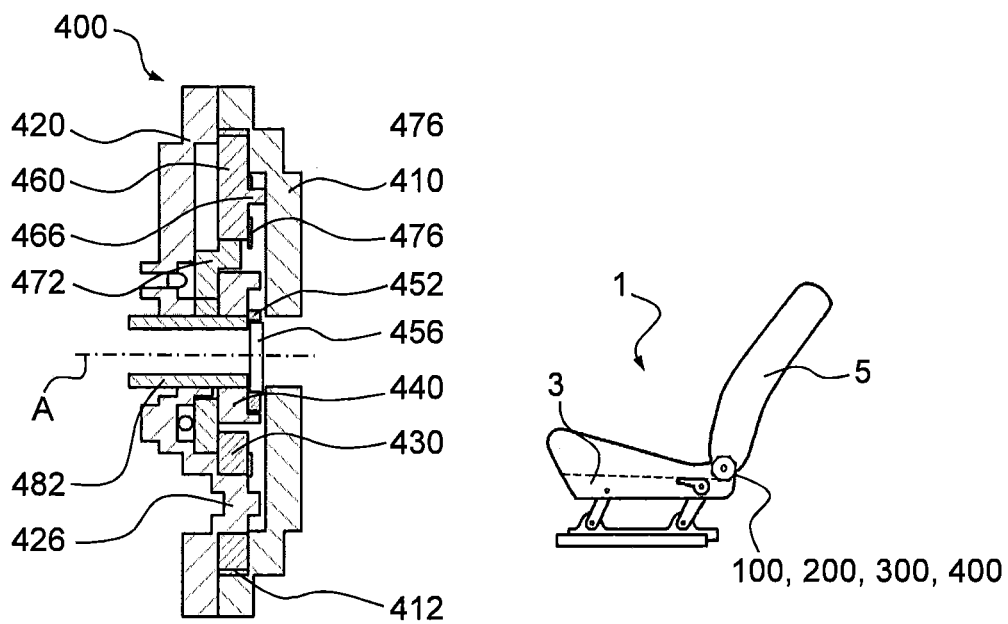

The gear stage 450 has a spur gear 452 mounted eccentrically to the central axis of rotation A with a central circular opening 454. A number of teeth of the spur gear 452 is at least one tooth smaller than a number of teeth of the inner toothing 444 of the sun gear 440. The spur gear 452 is in toothed engagement with the inner toothing 444 of the sun gear 340. An eccentric shaft 456, only shown schematically in FIG. 17, is arranged in the opening 454 of the spur gear 452, said eccentric shaft being drivable by the drive shaft in a wobbling manner with an eccentricity about the central axis of rotation A. To this end the eccentric shaft 456 is mounted eccentrically to the central axis of rotation A.

In a central position of the drive socket 482 in which the detent lock is locked, the drive socket 482 is rotatable in both rotational directions initially in the region of one respective empty angle in a defined manner, before the drive socket 482 rotates the eccentric shaft 456. In both rotational directions, after passing through the respective empty angle out of the central position of the drive socket 482, the eccentric shaft 456 is coupled to the drive socket 482 for entrainment. For generating the empty angle a driver pin of the drive socket 382 engages in a groove 458 of the eccentric shaft 456 with a play corresponding to the empty angles.

The drive socket 482 in the present case is connectable fixedly in terms of rotation to the drive shaft, in particular by a spline. The drive socket 482 rotating about the central axis of rotation A after passing through the empty angle, via the eccentric shaft 456 wobbling about the central axis of rotation A, effects a drive of the sun gear 440 with a gear reduction corresponding to the tooth ratio of the wobble gear.

The locking elements 460 in each case are movably guided in the radial direction in the respectively assigned guide 424. The locking elements 460 in each case bear radially outwardly a toothing 462 which is able to be brought into toothed engagement with the inner toothing 412 of the first fitting part 410. To this end the locking elements 460 may be controlled into the inner toothing 412 and controlled out of the inner toothing 412 by means of the eccentric subassembly 470. When the locking elements 460 which are guided in the second fitting part 420 are in toothed engagement with the inner toothing 412 of the first fitting part 410, the first fitting part 310 and the second fitting part 320 are locked together.

The eccentric subassembly 470 comprises an eccentric 472 with radially protruding eccentric cams 474 and a control disk 476 which is connected fixedly in terms of rotation to the eccentric 472. For the rotationally fixed connection, axially protruding lugs 475 of the control disk 476 engage between the eccentric cams 474.

The control disk has three control slides 478 for the targeted movement of the locking elements 460. The locking elements 460 have in each case a control lug 466 which in each case engages in a control slide 478 of the control disk 476.

The locking elements 460 have cams 464 on the radially internal side, which are configured in a complementary manner to the eccentric cams 474 and which are able to be supported by the eccentric cams 474. In a central position of the eccentric 472, the eccentric cams 474 support the locking elements 460 radially such that the toothing 462 of the locking elements 460 is held in engagement with the inner toothing 412. If the eccentric 472 is outside its central position the cams 464 are not supported by the eccentric cams 474.

By rotating the eccentric subassembly 470 about the central axis of rotation A the eccentric 472 rotates out of its central position, whereby the eccentric cams 474 rotate away below the cams 464 of the locking elements 460, so that the locking elements 460 are movable radially inwardly out of the inner toothing 412. The control lugs 466 of the locking elements 460 are correspondingly pulled radially inwardly by means of the control slides 478. By rotating the drive socket 482, the first fitting part 410 may be now rotated relative to the second fitting part 420 by means of the planetary gear system.

The eccentric subassembly 470 is pretensioned by means of a spring 479 from both rotational directions into a central position of the eccentric subassembly 470. By switching off the drive of the drive socket 482, by means of the spring 479 the eccentric 472 is rotated back into the central position of the eccentric subassembly 470. As a result, the control slides 478 release a movement of the control lugs 466 of the locking elements 460 radially outwardly. Additionally the eccentric cams 474 move the locking elements 460 radially outwardly in toothed engagement with the inner toothing 412 of the first fitting part 410. The present rotational angular position of the drive socket 482 is now the new central position thereof for the next adjustment process of the adjustment fitting 400.

The result of the clamping coupling 480 is that with a rotation of the drive socket 482 the eccentric subassembly 470 is initially rotated, whereby the locking elements 460 are pulled radially inwardly out of toothed engagement with the second inner toothing 414 so that the fitting parts 410, 420 are no longer locked together. With a further rotation of the drive socket 482, after passing through the empty angle between the drive socket 482 and the eccentric shaft 456, the driver pin rotates the eccentric shaft 456 and drives the gear stage 450 and thus the sun gear 440.

The clamping coupling 480 has six clamping bodies designed as clamping rollers 486 and three energy storage elements designed as rubber springs 488, which are arranged in an annular channel 490. A radial inner annular channel wall 492 is defined by an outer peripheral surface of the drive socket 482. The radial inner annular channel wall 492 is circular cylindrical. A radial outer annular channel wall 494 is formed by an opening in the eccentric 472. The radial outer annular channel wall 494 has three circular cylindrical positions, in the peripheral direction in each case one of a total of three clamping beads 496 being arranged therebetween. The clamping beads 496 have in the direction of the radial inner annular channel wall 492 and, viewed in the peripheral direction, in each case on both sides an oblique lead-in surface 497 respectively for one of the clamping rollers 486.

The annular channel 490 has in the region of the circular cylindrical portions of the radial outer annular channel wall 490 in the radial direction a width which is slightly greater than a diameter of the clamping rollers 486. In the region of the lead-in surfaces 497 the annular channel 490 has in the radial direction a width which is smaller than a diameter of the clamping rollers 486.

In each case two clamping rollers 486 form a clamping roller pair and are arranged between two lead-in chamfers 497 of adjacent clamping beads 496. The clamping coupling 480 has three equally acting clamping roller pairs, of which hereinafter only one clamping roller pair is described.

In each case one of the rubber springs 488 is arranged between the two clamping rollers 486 of the clamping roller pair. In an unactuated state of the adjustment fitting 400 the rubber springs 488 brace the two clamping rollers 486 away from one another against an assigned lead-in chamfer 497. Depending on the rotational direction of the drive socket 482, one of the two clamping rollers 486 is clamped between a lead-in chamfer 497 and the radial inner annular channel wall 492. As a result, a rotational movement of the drive socket 482 initially causes a rotation of the eccentric subassembly 472 such that the locking elements 460 are pulled radially inwardly into an unlocked position.

The second fitting part 420 has three unlocking cams 427, in each case one unlocking cam 427 thereof engaging between two clamping rollers 486 of adjacent clamping rollers. In an unactuated state of the adjustment fitting 400 in each case an unlocking cam 427 is arranged centrally between the two clamping rollers 486. The unlocking cams 427 have on both sides in each case a spacing from the clamping rollers 486.

With a rotational movement of the drive socket 482, the eccentric subassembly 472 rotates until the clamping rollers 486 run against the unlocking cams 427 of the second fitting part 420. By the clamping rollers 486 running against the unlocking cams 427, the clamping rollers 486 with a further pretensioning of the rubber spring 488 are pushed by the assigned lead-in chamfers 497, whereby the entrainment of the eccentric subassembly 472 is interrupted.

During the course of the further rotational movement of the drive socket 482 the driver pin of the rotating drive socket 482 now comes into abutment with a wall defining the groove of the eccentric shaft 456, whereby the eccentric shaft 456 is rotated therewith and drives the planetary gear system. As soon as the rotational movement of the drive socket 482 is terminated, the spring 479 rotates the eccentric subassembly 470 again into the central position thereof so that the adjustment fitting 400 is locked again.

FIG. 18 shows a vehicle seat 1 according to the invention for a motor vehicle. The vehicle seat 1 has a seat part 3 and a backrest 5 which is adjustable in its inclination relative to the seat part 3. For adjusting the inclination of the backrest 5 a transmission rod is rotated, for example manually, by means of a hand wheel or by motor, for example by means of an electric motor. The transmission rod is arranged horizontally in the transition region between the seat part 3 and the backrest 5. On both sides of the vehicle seat 1 the transmission rod engages fixedly in terms of rotation in one respective adjustment fitting 100, 200, 300, 400 according to the invention.

The features disclosed in the above description, the claims and the figures may be important both individually and in combination for implementing the invention in its various embodiments, provided they remain within the protected scope of the claims.

Terms used in the claims such as "comprise", "have", "contain", "include" and the like do not exclude further elements or steps. The use of the indefinite article does not exclude a plurality thereof. A single device may perform the functions of a plurality of units or, respectively, devices cited in the claims.

1 Vehicle seat
  3 Seat substructure
  5 Backrest
  100 Adjustment fitting
  110 First fitting part
  112 First inner toothing
  114 Second inner toothing
  120 Second fitting part
  122 Guide
  130 Gearwheel, planet gear
  140 Locking element
  150 Eccentric
  200 Adjustment fitting
  220 Gear fitting
  230 Sun gear
  240 Detent lock
  250 Eccentric
  252 Locking element
  260 Logic element
  262 Clamping roller freewheel
  264 Spring
  266 Cylinder roller
  267 Compression spring
  268 Control webs
  270 Output shaft (of a geared motor)
  300 Adjustment fitting
  310 First fitting part
  312 First inner toothing
  314 Second inner toothing
  320 Second fitting part
  322 Guide segment
  324 Guide
  326 Bearing pin
  327 Unlocking cam
  328 Locking plate
  330 Gearwheel (planet gear)
  340 Sun gear
  342 Outer toothing
  344 Inner toothing
  350 Gear stage
  352 Spur gear
  354 Opening
  356 Eccentric shaft
  358 Groove
  360 Locking element
  362 Toothing
  364 Cam
  366 Control lug
  370 Eccentric subassembly
  372 Eccentric
  374 Eccentric cam
  376 Control disk
  378 Control slide
  379 Spring
  380 Clamping coupling
  382 Drive socket
  384 Driver pin
  386 Clamping roller
  388 Rubber spring
  390 Annular channel
  392 Inner annular channel wall
  394 Outer annular channel wall
  396 Clamping bead
  397 Lead-in surface 400 Adjustment fitting
410 First fitting part
412 Inner toothing
420 Second fitting part
422 Guide segment
424 Guide
426 Bearing pin
427 Unlocking cam
430 Gearwheel (planet gear)
440 Sun gear
442 Outer toothing
444 Inner toothing
450 Gear stage
452 Spur gear
454 Opening
456 Eccentric shaft
460 Locking element
462 Toothing
464 Cam
466 Control lug
470 Eccentric subassembly
472 Eccentric
474 Eccentric cam
475 Lug
476 Control disk
478 Control slide
479 Spring
480 Clamping coupling
482 Drive socket
486 Clamping roller
488 Rubber spring
490 Annular channel
492 Inner annular channel wall
494 Outer annular channel wall
496 Clamping bead
497 Lead-in surface
D Central axis of rotation A
W Drive shaft

The invention claimed is:

1. An adjustment fitting for adjusting an inclination of a backrest of the vehicle seat, comprising:
   a first fitting part connectable to a seat substructure of the vehicle seat, and
   a second fitting part which is pivotable about a central axis of rotation relative to the first fitting part and is connectable to the backrest of the vehicle seat,
      wherein the first fitting part and the second fitting part are components both of a gear unit of the adjustment fitting and of a locking device of the adjustment fitting;
   wherein the first fitting part has an inner toothing of the gear unit;
   wherein the inner toothing of the gear unit is arranged axially adjacent to an inner toothing of the locking device.

2. The adjustment fitting as claimed in claim 1, wherein the gear unit has a planetary gear system or is a planetary gear system.

3. The adjustment as claimed in claim 2, wherein the first fitting part acts as a ring gear of the planetary gear system and the second fitting part acts as a web of the planetary gear system.

4. The adjustment fitting as claimed in claim 1, wherein the locking device has a detent lock or is a detent lock.

5. The adjustment fitting as claimed in claim 4, wherein the second fitting part has at least one guide for at least one locking element of the detent lock.

6. The adjustment fitting as claimed in claim 4, wherein the at least one locking element is movable by rotating an eccentric subassembly from a central position of the eccentric subassembly into a position unlocking the adjustment fitting and is movable into a position locking the adjustment fitting via an opposing rotation back into the central position of the eccentric subassembly.

7. The adjustment fitting as claimed in claim 6, having an interface comprising a drive socket, for connecting the adjustment fitting to a drive comprising a drive shaft.

8. The adjustment fitting as claimed in claim 7, wherein a rotation of a drive socket from a central position of this drive socket via a clamping coupling effects a rotation of the eccentric subassembly and after rotating the drive socket beyond a defined angle the clamping coupling opens such that the drive socket may rotate further without rotating the eccentric subassembly at the same time.

9. The adjustment fitting as claimed in claim 8, wherein a sun gear of the gear stage is coupled with an empty angle to the drive socket, such that with a rotation of the drive socket from the central position thereof to a defined rotational angle of the drive socket the sun gear remains immobile, and with a rotation of the drive socket beyond the defined angle the sun gear rotates therewith.

10. The adjustment fitting as claimed in claim 9, wherein a gear stage comprising a wobble gear is arranged between the drive socket and the sun gear.

11. The adjustment fitting as claimed in claim 1, wherein the first fitting part has an inner toothing of the locking device.

12. The adjustment fitting as claimed in claim 1, wherein the inner toothing of the gear unit is identical to the inner toothing of the locking device.

13. A vehicle seat comprising an adjustment fitting as claimed in claim 1.

14. An adjustment fitting for adjusting an inclination of a backrest of the vehicle seat, comprising:
   a first fitting part connectable to a seat substructure of the vehicle seat, and
   a second fitting part which is pivotable about a central axis of rotation relative to the first fitting part and is connectable to the backrest of the vehicle seat,
      wherein the first fitting part and the second fitting part are components both of a gear unit of the adjustment fitting and of a locking device of the adjustment fitting;
   wherein the gear unit has a planetary gear system or is a planetary gear system;
   wherein the first fitting part acts as a ring gear of the planetary gear system and the second fitting part acts as a web of the planetary gear system.

* * * * *